Figure 1:
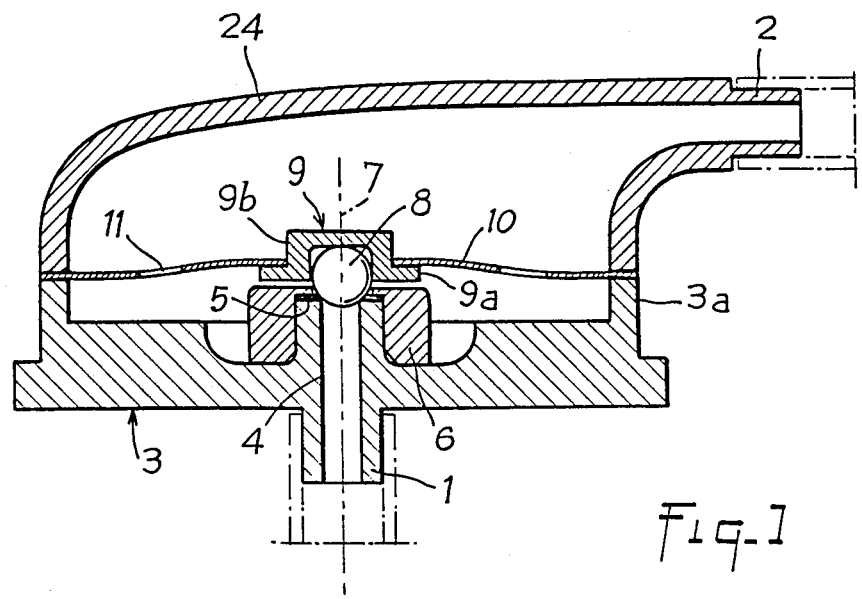

United States Patent [19]

Gouhier

[11] Patent Number: 4,852,605

[45] Date of Patent: Aug. 1, 1989

[54] VALVE OPERATING WITHOUT FRICTION

[75] Inventor: Dany Gouhier, Saint Pierre De Bailleul, France

[73] Assignee: Societe Anonyme: Societe Europeenne De Propulsion, Suresnes, France

[21] Appl. No.: 141,609

[22] PCT Filed: Apr. 13, 1987

[86] PCT No.: PCT/FR87/00119

§ 371 Date: Dec. 14, 1987

§ 102(e) Date: Dec. 14, 1987

[87] PCT Pub. No.: WO87/06320

PCT Pub. Date: Oct. 22, 1987

[30] Foreign Application Priority Data

Apr. 14, 1986 [FR] France .................... 86 05288

[51] Int. Cl.$^4$ ............. F16K 15/14; F16K 17/18; F16K 31/06

[52] U.S. Cl. ................ 137/493; 137/539.5; 137/859; 251/129.16; 251/129.17

[58] Field of Search ............ 137/493, 539.5, 859; 251/129.17, 129.16

[56] References Cited

U.S. PATENT DOCUMENTS 3,105,507 10/1963 Dunmire ............ 137/859 X
4,252,116 2/1981 Genese ............. 137/859 X
4,365,747 12/1982 Knapp ............ 251/129.17 X

FOREIGN PATENT DOCUMENTS 599652 6/1960 Canada ............ 251/129.17
2303450 8/1974 Fed. Rep. of Germany .
3329652 2/1985 Fed. Rep. of Germany .
572433 1/1958 Italy ................ 137/859
108547 1/1925 Switzerland .
2082292 3/1982 United Kingdom .

Primary Examiner—Robert G. Nilson
Attorney, Agent, or Firm—Weingarten, Schurgin, Gagenbin & Hayes

[57] ABSTRACT

A valve which works without friction is provided which includes a movable obturating member and an annular seat. The annular seat is secured to a base by means of a support. The obturating member, preferably a ball, is set in a support which is fixed in the central opening of a substantially flat circular flexible membrane. The circular membrane is secured in a prestressed condition, in a plane parallel to the plane of the annular seat with the obturating ball member coaxial to the seat, by welding the contour of the membrane to the base. The membrane is mechanically isotropic so as to be radially rigid in the plane thereof and deformable in the direction perpendicular to its plane. Deformation of the circular membrane in directions perpendicular to its plane cause the obturating ball member to move into and away from the annular seat to interrupt and allow fluid flow therethrough. The prestressed condition of the membrane exerts a restoring force which causes the obturating ball member to seat in the annular seat. Deformation of the circular membrane is accomplished without any friction between the obturating ball member and its support, the contour of the membrane and the base and the obturating ball member and the annular seat.

6 Claims, 2 Drawing Sheets

VALVE OPERATING WITHOUT FRICTION

The invention relates to a valve comprising a movable obturating member and a conjugate annular seat, said obturating member being able to move along a direction perpendicular to the plane of the seat in order to come and obturate the latter, or to move away therefrom, the valve being then capable of interrupting or allowing the flow of a fluid through said seat.

In a valve of this type, the displacements of the obturating member with respect to its seat are generally accompanied by frictions between the movable parts, these frictions causing said parts to wear out, and being sources of pollution of the fluid by solid particles coming off said parts (and risking to cause obstructions in the circuit of fluid). Such phenomena are particularly bad when the valve as well as the equipment associated thereto are required to have a long life and in cases when the valve cannot be controlled or maintained.

It is the object of the present invention to overcome these drawbacks, with a valve which works without friction, in which the obturating member, preferably constituted by a ball cooperating with a truncated seat, is fixed in the center of a substantially flat flexible circular membrane, placed in parallel to the plane of the seat, said membrane, which is mechanically isotropic about its center, being deformable in the direction perpendicular to its plane, but substantially rigid in any direction radial to the latter, whereas said membrane is constrained along its contour in a base with which the said seat is fast.

In a valve of this design, the displacements of the obturating member are only accompanied by deformations of the membrane through bending out of its natural plane, without any friction either between the obturating member and the central part of the member (with respect to which it is fixed), or between the contour of the membrane and the base supporting it (due to the constraining connection provided here). There is therefore no wearing down due to friction, and even less risks of pollution of the fluid flowing through the valve, this making the valve, as well as the devices to which said valve is connected, long lasting and extremely reliable. In addition, a valve according to the invention no longer needs lubricating, since there is no risk of seizing. Also, since the membrane causes the obturating member to be perfectly and permanently co-axial to its seat, there is no friction either between these last elements, which procures excellent and durable tightness.

According to one particular embodiment, the membrane comprises a central circular opening and the obturating member is fixed to a support in which the membrane is constrained along the contour of said opening. This novel constraining condition ensures the fixedness of the obturating member with respect to the center part of the membrane.

The constraining connection of the membrane with the base and optionally with the support of the obturating member can be obtained by welding, adhesive bonding, gripping or crimping, or by any other equivalent joining means.

In one embodiment, the membrane, with optionally the support in which it is constrained in its center, form a continuous wall defining a chamber with the base, said latter being provided with an orifice allowing the fluid to flow through said chamber.

In another embodiment, the membrane is perforated to allow the fluid to flow therethrough; the base then has no other orifice but the one necessary to allow the flow of fluid to reach the obturatable seat.

The membrane may be so designed as to be elastically deformable so that, being mounted in pre-stressed condition, it exerts a restoring force on the obturating member, which force can for example tend to apply the obturating member on its seat. A valve which has such a structure is directly applicable to the production of a non-return valve.

It is further possible to associate to a valve as above-defined an actuating device with which to control the displacements of its obturating member. When said actuating device is an electro-magnet, which is capable of acting directly or indirectly on the obturating member, a high quality electrovalve is obtained.

Other characteristics and advantages of the invention will emerge more clearly from the following description of non-restrictive examples of embodiment, with reference to the accompanying drawings.

Figure 2:
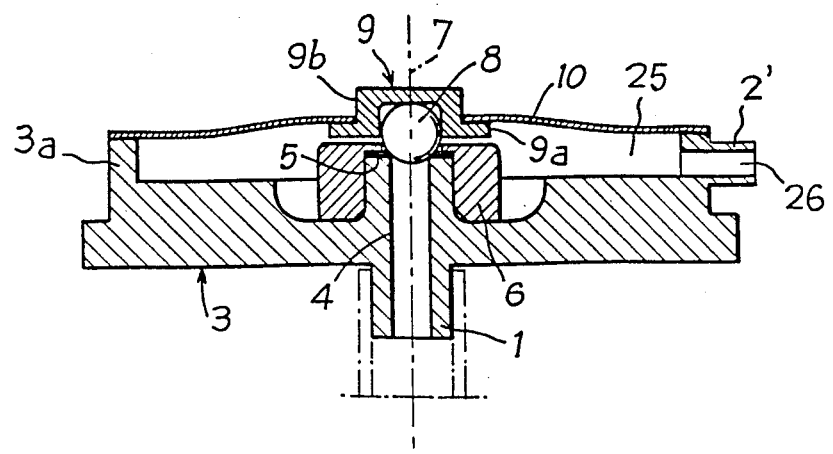
Figure 3:
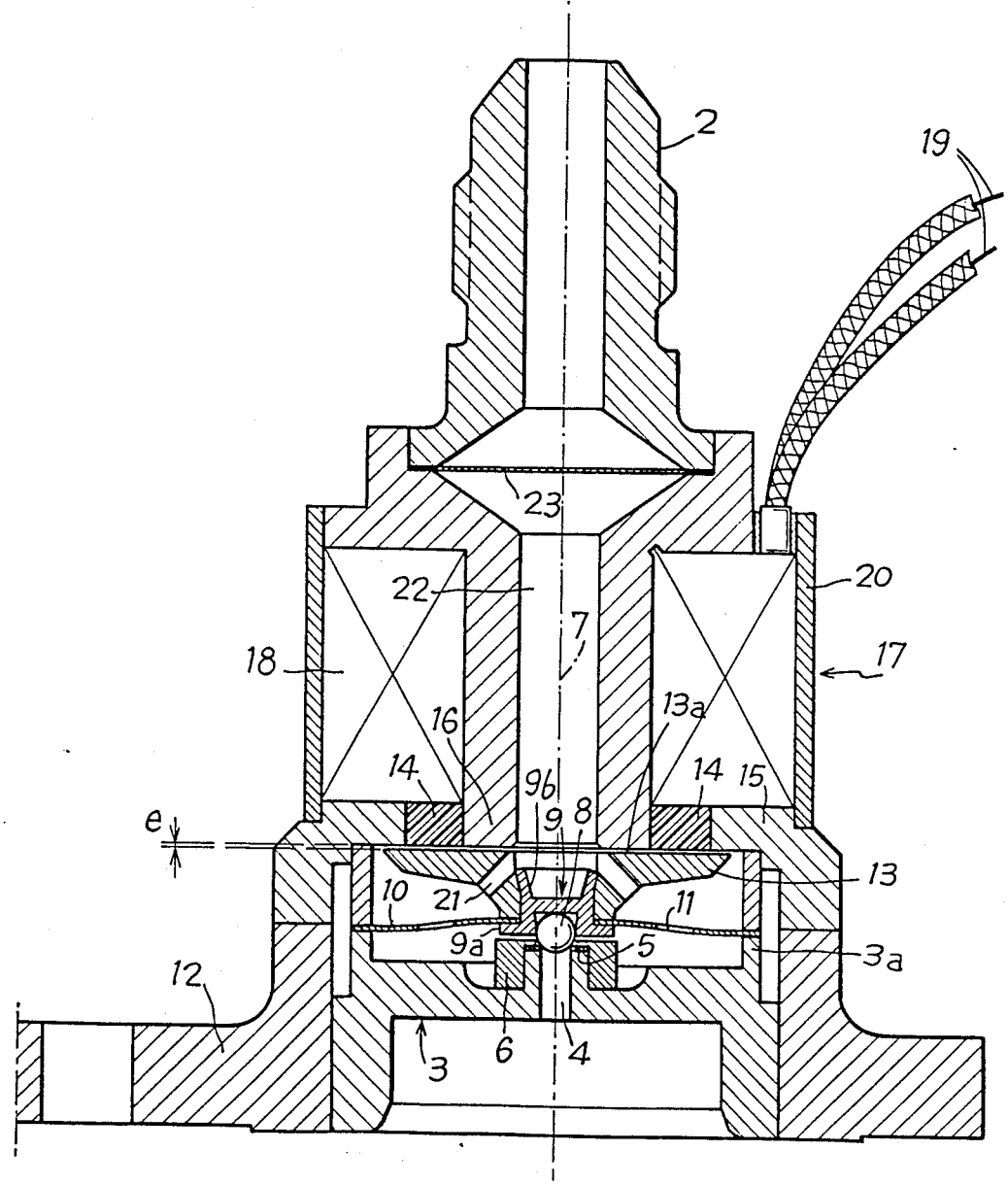

FIG. 1 to is a cross-sectional view of one embodiment of a non-return valve according to the present invention;

FIG. 2 is a cross-sectional view of another embodiment of a non-return valve according to the present invention; and FIG. 3 is a cross-sectional view of an embodiment of an electrovalve according to the present invention.

FIG. 1 shows a non-return valve having an inlet endpiece 1 and an outlet endpiece 2 by which it can be inserted in a feeding pipe through which flows a fluid. Endpiece 1 projects from a disc-shaped base 3 provided in its center, and along the axis of said endpiece, with a duct 4.

At the end of the said duct which is opposite to the endpiece 1, there is provided a ring 5 produced in a slightly supple material, such as Teflon, and kept fast with the base by a part 6. The ring 5, of which the plane is parallel to that of the base and perpendicular to the axis 7 of the duct 4, serves as a seat for a movable obturating member constituted by a ball 8.

Said ball is set in a support 9 fixed in the central opening of a substantially flat circular membrane 10, of which the contour is fixed to a border 3a, which is provided co-axially to axis 7, on the base 3. The membrane 10, which extends perpendicularly to axis 7 is elastically deformable in the direction of said axis, but is rigid in any radial direction with respect to said axis. The result is that the membrane 10 allows the displacements of the ball 8 along axis 7, while preserving a constant and accurate centering thereof on said axis, hence with respect to the seat 5.

As illustrated, the membrane 10, which is naturally flat, is mounted with a certain amount of pre-stressing in the direction of axis 7, so as to exert on the ball 8 a restoring force which applies said ball on its seat 5 in closing position in order to ensure tightness even when vibrations occur.

Over the membrane, there is provided a casing 24, which connects up with the border 3a of the base 3 and to which belongs the outlet endpiece 2.

When a fluid is admitted through the inlet endpiece 1, it exerts a pressing force on the ball 8; the latter then rises, leaving its seat 5, and the fluid finds a way into the annular space which is then provided between the ball and the seat, toward the outlet endpiece 2, which said fluid reaches through the membrane 10 via orifices 11 provided therein.

In reverse, when the fluid reaches the outlet endpiece 2, it finds the ball 8 in closing position on its seat 5, so that said fluid is prevented from reaching endpiece 1.

FIG. 2 shows a variant embodiment in which the membrane 10 is formed by a continuous non-perforated sheet, defining with the base 3 and the border 3a thereof a chamber 25. In this case, there is provided, under the membrane 10, namely on the same side as inlet endpiece 1, an outlet endpiece 2' facing an orifice 26 provided in the border 3a (or else in the actual base 3), whereas the casing 24, which has become unnecessary, disappears.

The constraining connections of the membrane 10 with the base 3, on the one hand, and with the support 9 of the ball 8, on the other hand, can be achieved by any appropriate means: welding, adhesive bonding, gripping crimping, etc. In the present example, it is welded along its external contour to the border 3a of the base of its central opening, on a flange 9a provided on the support 9, which latter is force-fitted in said opening by another part 9b of cylindrical shape, having the same diameter as said opening.

FIG. 3 shows an electrovalve produced with a valve such as shown in FIG. 1, and homologue elements bear the same reference numerals. Here, the base 3 is mounted in a stand 12. As to the membrane 10, this is gripped along the contour of its central opening, between the flange 9a of the support 9 of the ball 8 and the end of an annular piece 13 mounted co-axially to axis 7, in which annular piece, support 9 is immobilized by crimping.

The flat face 13a presented by the piece 13 opposite to its end gripping the membrane 10, is in facing relationship, with a slight air gap e in the direction of axis 7, to a non-magnetic annular gap 14 provided between the polar pieces 15 and 16 of an electro-magnet 17 comprising a magnetizing coil 18, with a general structure co-axial to axis 7.

When inoperative, the ball 8 is, as in the non-return valve illustrated in FIG. 1, held by the membrane 10 in closing position where it obturates its seat 5.

When the coil 18 of electro-magnet 17 is energized via supply lines 19, the piece 13, which is produced from a magnetic metal in order to serve as a mobile armature to the electro-magnet 17, is attracted toward the polar pieces 15, 16 thereof by the magnetic flux created in the magnetic circuit formed by the polar piece 15, the mobile armature 13, the polar piece 16 and a cylindrical sleeve 20 enclosing said circuit around the coil 18. In moving, armature 13 carries the ball 8 via its support 9, so that said ball performs a rectilinear stroke along axis 7 of its seat 5 and leaves the latter. A way is thus opened for the fluid, the flow of which is controlled by the electrovalve, said way traversing duct 4, orifices 11 of membrane 10, ducts 21 formed obliquely through armature piece 13, a pipe 22 provided axially in part 16, a filter 23 and endpiece 2. When the coil 18 ceases to be energized, the ball 8 is recalled to the closing position on its seat 5 by elastic membrane 10.

As can be seen in FIG. 3, base 3 and the annular piece topping it above membrane 10, seat 5 and its support 6, membrane 10, ball 8 and its support 9, as well as magnetic piece 13 form a fluid-obturating unitary assembly which is mounted as such, preferably in removable manner, on the actuating device formed by the electro-magnet 17, its polar pieces 15, 16 and the stand 12. Thus, to the same actuating block can be associated any one of a plurality of unitary obturating assemblies, of different or identical characteristics.

Reverting to the valve shown in FIG. 2, it can be seen that this valve can allow a fluid to flow through in two opposite directions, the fluid either flowing in through endpiece 1 and flowing out through endpiece 2', or the fluid flowing in through the latter and flowing out through endpiece 1. In each case, the fluid can only flow through if its pressure is higher than a threshold value which must be reached in order to detach the ball from its seat 5. Because of the different surface presented by the ball 8 to the fluid admitted through endpiece 1 and by the membrane 10 to the fluid admitted through endpiece 2', the pressure threshold is higher in the first case than in the second.

More generally, the valve structure gives excellent stability of centering of the ball 8 with respect to the seat 5 and of the ball stroke, when these have been adjusted at manufacture, and this in the hardest conditions of operation and after a very large number of manoeuvers.

I claim:

1. A valve comprising:
   a base;
   a conjugated annular seat including a support to secure said conjugated annular seat to said base and a truncated seat;
   a substantially flat flexible circular membrane having a central circular opening, said circular membrane being mechanically isotropic about the center thereof, elastically deformable in a direction perpendicular to the plane of said circular membrane, and substantially rigid in any radial direction of the plane of said circular membrane;
   a support secured by welding in said central circular opening to constrain said support in said circular membrane;
   an obturating ball member fixed in said support for movement in a direction perpendicular to the plane of said truncated seat to permit said obturating ball member to move into and away from said truncated seat to interrupt and allow fluid flow through said truncated seat, respectively; and wherein
   said circular membrane is secured to said base in a prestressed condition by welding the contour of said circular member to said base to contain said circular membrane in said base, said circular membrane being secured in a plane parallel to the plane of said truncated seat with said obturating ball member centered in confronting relation with said truncated seat, and wherein the prestressed condition of said circular membrane exerts a restoring force on said obturating ball member to cause said obturating ball member to seat in said truncated seat.

2. Valve according to claim 1 characterized by the fact that the circular membrane and said support in which said circular membrane is fitted form a continuous wall defining a chamber (25) with the base, said base being provided with an orifice (26) allowing the flow of fluid therethrough, the valve thus forming a check valve which operates in the two flowing directions of the fluid, and allowing the fluid flow only when its pressure exceeds a predetermined threshold the valve of which is dependent on the selected flowing direction through the valve.

3. Valve according to claim 1, characterized by the fact that the membrane (10) is perforated to allow the flow of fluid therethrough.

4. Valve according to claim 1 characterized by the fact that an actuating device is disposed in combination with said valve for controlling the displacements of the obturating ball member (8).

5. Valve according to claim 4, characterized by the fact that the actuating device includes an electro-magnet (17) acting on the obturating ball member (8).

6. Valve according to claim 1, characterized by the fact that said base conjugated annular seat, said obturating ball member, said support for said obturating ball member, and said circular membrane constitute a unitary assembly.

* * * * *

UNITED STATES PATENT AND TRADEMARK OFFICE
CERTIFICATE OF CORRECTION

PATENT NO. : 4,852,605

DATED : August 1, 1989

INVENTOR(S) : Dany Gouhier

It is certified that error appears in the above-identified patent and that said Letters Patent is hereby corrected as shown below:

In Column 2, line 22, "FIG. 1 to is" should read --FIG. 1 is--.

In Column 4, line 47, "contain" should read --constrain--.

In Column 4, line 66, "valve" should read --value--.

In Column 6, line 4, "base conjugated" should read --base, said conjugated--.

Signed and Sealed this

Ninth Day of June, 1992

*Attest:*

DOUGLAS B. COMER

*Attesting Officer*   *Acting Commissioner of Patents and Trademarks*